US010455392B2

(12) United States Patent
Zeng et al.

(10) Patent No.: US 10,455,392 B2
(45) Date of Patent: Oct. 22, 2019

(54) ADAPTIVE MATCHING WITH ANTENNA DETUNING DETECTION

(71) Applicant: Apple Inc., Cupertino, CA (US)

(72) Inventors: Xinping Zeng, San Jose, CA (US); Peter M. Agboh, Burlingame, CA (US); Vusthla Sunil Reddy, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/716,712

(22) Filed: Sep. 27, 2017

(65) Prior Publication Data

US 2019/0098435 A1 Mar. 28, 2019

(51) Int. Cl.
| | | |
|---|---|---|
| *H04B 5/00* | (2006.01) | |
| *H04B 17/21* | (2015.01) | |
| *H04W 4/80* | (2018.01) | |
| *H01Q 1/52* | (2006.01) | |
| *H01Q 1/22* | (2006.01) | |
| *H04B 5/02* | (2006.01) | |

(52) U.S. Cl.
CPC ............ *H04W 4/80* (2018.02); *H01Q 1/2216* (2013.01); *H01Q 1/52* (2013.01); *H04B 5/0031* (2013.01); *H04B 5/02* (2013.01)

(58) Field of Classification Search
CPC .................................................. H04B 5/0075
See application file for complete search history.

(56) References Cited

U.S. PATENT DOCUMENTS

| | | | | |
|---|---|---|---|---|
| 6,564,040 | B1* | 5/2003 | Fujiwara | H04B 15/06 |
| | | | | 375/376 |
| 6,930,523 | B2* | 8/2005 | Ungstad | G06F 1/10 |
| | | | | 327/156 |
| 10,063,367 | B1* | 8/2018 | Aouini | H04B 10/40 |
| 2004/0183610 | A1* | 9/2004 | Seppinen | B82Y 25/00 |
| | | | | 331/177 V |
| 2007/0091006 | A1* | 4/2007 | Thober | H01Q 7/005 |
| | | | | 343/745 |
| 2007/0194859 | A1* | 8/2007 | Brobston | H03H 7/40 |
| | | | | 333/17.3 |
| 2010/0278014 | A1* | 11/2010 | Rhodes | H04B 13/02 |
| | | | | 367/134 |
| 2011/0043429 | A1 | 2/2011 | Merlin | |
| 2011/0230155 | A1* | 9/2011 | Sapone | H04B 1/26 |
| | | | | 455/208 |

(Continued)

*Primary Examiner* — Cindy Trandai
(74) *Attorney, Agent, or Firm* — Fletcher Yoder PC

(57) ABSTRACT

An electronic device includes a transmitter configured to generate a signal. The electronic device also includes tuning circuitry coupled to the transmitter, wherein the tuning circuitry comprises a variable capacitance element and at least one fixed capacitance element having a fixed capacitance, wherein the variable capacitance element is configured to provide a dynamic capacitance based upon a voltage value related to a determined phase difference between the signal and a second signal, wherein the tuning circuitry is configured to adjust a frequency of the first signal to generate a tuned signal based upon a total capacitance comprising the fixed capacitance and the dynamic capacitance. The electronic device further includes an antenna coupled to the tuning circuitry and configured to generate an electromagnetic field based on the tuned signal.

20 Claims, 7 Drawing Sheets

(56) References Cited

U.S. PATENT DOCUMENTS

| | | | |
|---|---|---|---|
| 2013/0249750 A1* | 9/2013 | Matsui | H01Q 1/242 343/745 |
| 2014/0035649 A1* | 2/2014 | Nedovic | G06F 1/08 327/299 |
| 2014/0127995 A1 | 8/2014 | Hendricksen et al. | |
| 2014/0241556 A1* | 8/2014 | Larsen | H04L 27/14 381/316 |
| 2015/0022024 A1* | 1/2015 | Dicicco | H03K 17/16 307/109 |
| 2015/0180496 A1* | 6/2015 | Drago | H03M 1/462 341/122 |
| 2015/0303997 A1 | 10/2015 | Dhayni | |
| 2016/0105188 A1* | 4/2016 | Cho | H03L 7/087 375/374 |
| 2016/0111894 A1* | 4/2016 | Bishtein | H02J 7/025 307/104 |
| 2016/0197510 A1 | 7/2016 | Strommer et al. | |
| 2016/0233763 A1* | 8/2016 | Park | H02M 3/07 |
| 2016/0329085 A1* | 11/2016 | Yu | G11C 7/22 |
| 2016/0336924 A1* | 11/2016 | Yu | H03K 3/011 |
| 2016/0345123 A1 | 11/2016 | Lamba et al. | |
| 2017/0184688 A1* | 6/2017 | Nakamura | G01R 33/0041 |
| 2017/0264322 A1* | 9/2017 | Greene | H04B 1/18 |
| 2017/0288736 A1* | 10/2017 | Zhou | H04B 5/0037 |
| 2018/0034510 A1* | 2/2018 | Hueber | H04B 5/0056 |
| 2018/0040953 A1* | 2/2018 | Gebhart | H01Q 3/30 |
| 2018/0165560 A1* | 6/2018 | Philip | G06K 19/0705 |
| 2019/0097687 A1* | 3/2019 | Hueber | H04B 5/0031 |

* cited by examiner

ADAPTIVE MATCHING WITH ANTENNA DETUNING DETECTION

BACKGROUND

The present disclosure relates generally to altering characteristics of a wireless power communication reader.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication devices (e.g., smartphones, wearable devices, etc.) are proliferating. Many wireless communication devices support multiple communication protocols on the same platform. For example, wireless communication devices may use Long-Term Evolution (LTE), Wideband Code Division Multiple Access (WCDMA), wireless local area networks (WLAN), Bluetooth, Global Positioning System (GPS), Near-Field Communication (NFC), and/or other suitable wireless communication protocols. NFC communications are beneficial, since they allow for a low-power transmission system between devices. Due to the low-power communications that NFC allows for, use of NFC technology has expanded. However, issues arise in the use of NFC transceivers. For example, as an NFC reader is put close to a tag, the proximity to the tag may change the antenna characteristics of the reader (e.g., antenna detuning). This may be caused due to inductive coupling and may result in reduced validity of NFC transmitted and received received signals.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Antenna detuning in a Near-Field Communication (NFC) transceiver may cause a change in a front-end frequency response of the reader the transceiver. In one embodiment, the selective use of via materials (e.g., ferrite materials) placed about the NFC transceiver may operate to reduce, minimize, or eliminate changes in the front-end frequency response of the NFC reader due to antenna detuning. However, in other embodiments, size, location, cost, or other constraints may disfavor use of particular materials to lessen changes in the front end frequency response of the NFC reader and, therefore, antenna detuning detection as well as correction of the front-end frequency response may be implemented.

In some embodiments, active (e.g., dynamic) control of an adjustable circuit element (e.g., a varactor diode) may be performed. For example, a frequency and/or phase control loop may be implemented to dynamically adjust a circuit element to correct the front end frequency response of the NFC reader based on a detected antenna detuning condition.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
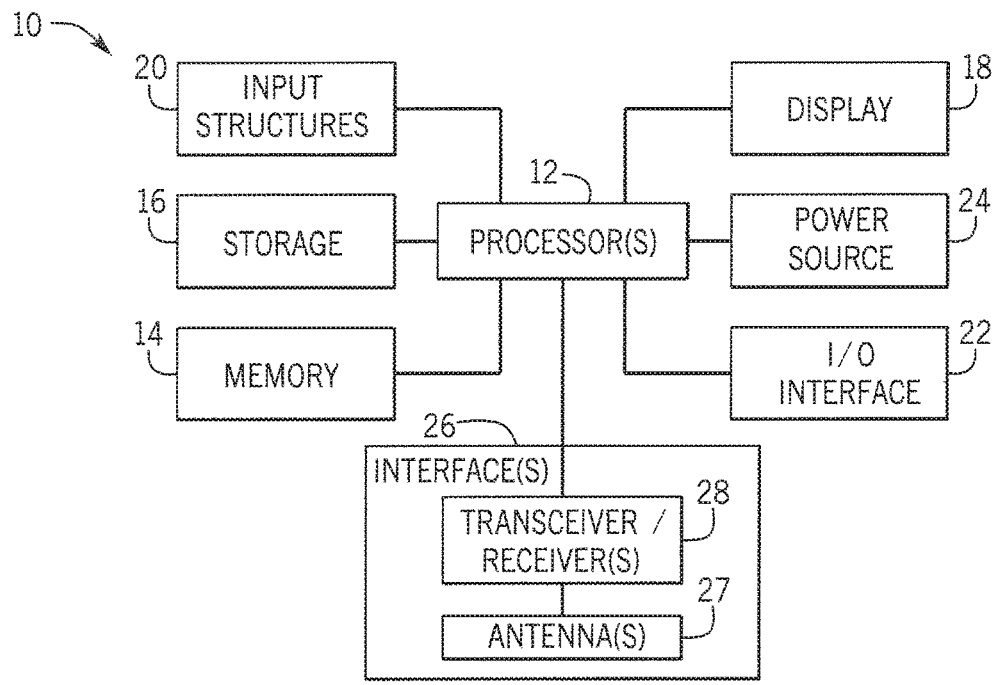
FIG. 1 is a schematic block diagram of an electronic device including wireless transceiver(s)/receiver(s), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Many smart devices, such as smartphones, wearable devices, tablets, and computers, support various communication protocols, including Near-Field Communication (NFC). NFC is a short-range, low-power communication technology that allows for contactless communication between two devices are brought within close proximity to one another (e.g., within approximately 5 centimeters or less of one another). NFC transmissions typically operate at a 13.56 MHz frequency and allow for data transfers of up to approximately 424 kilobits per second.

NFC transmissions typically utilize magnetic field induction (e.g., inductive coupling or resonant inductive coupling) to allow for communication between two devices. When two NFC-compatible devices are within sufficient proximity, a first device (e.g., an active device able to send and receive information via NFC) generates an electromagnetic field with a particular frequency (e.g., at 13.56 MHz). A portion of the electromagnetic field contacts an antenna of a second device (e.g., which may be a passive device able only to send information via NFC or an active device) and induces a magnetic field, causing an electrical current to be generated in the antenna of the first device. However, as the second antenna is introduced into the electromagnetic field of the first device, the tuning of the antenna of the first device may be changed and this change in the characteristics of the antenna of the first device (e.g., antenna detuning) may cause the frequency of the antenna to shift from the desired transmission frequency. This shift may worsen as the proximity of the first device and the second device increases.

Accordingly, to offset the antenna detuning, monitoring may be employed in the first device whereby detection of detuning may occur. Additionally, a compensation system may be employed to correct for the antenna detuning to reduce reduce and/or eliminate the antenna detuning. In some embodiments, automatic correction of detuning of an antenna may be performed via a feedback control loop that operates without resorting to trial and error modifications of the transmitting circuitry of the first device.

With the foregoing in mind and referring first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and network interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., e.g., pressing a button to increase or decrease a volume level). The I/O interface 22 may enable electronic device 10 to interface with various other electronic devices. The I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include a power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The interface(s) 26 enable the electronic device 10 to connect to one or more network types. The interface(s) 26 may also include, for example, interfaces for a personal area network (e.g., PAN), such as a Bluetooth network, for a local area network (e.g., LAN) or wireless local area network (e.g., WLAN), such as an 802.11x Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The interface(s) 26 may also include interfaces for, for example, broadband fixed wireless access networks (e.g., WiMAX), mobile broadband Wireless networks (e.g., mobile WiMAX), and so forth and/or an NFC interface. The interface(s) 26 include antenna(s) 27 that detect and/or transmit wireless signals around the electronic device 10 and passes the received signals to transceiver/receiver(s) 28. The transceiver/receiver(s) 28 may include one or more receivers and/or transmitters that are configured to send and/or receive information via one or more respective antennas of the antenna(s) 27. Each transceiver/receiver 28 may be connected to its own antenna 27. Alternatively, at least least some of the transceiver/receiver(s) 28 may share an antenna 27.

Figure 2:
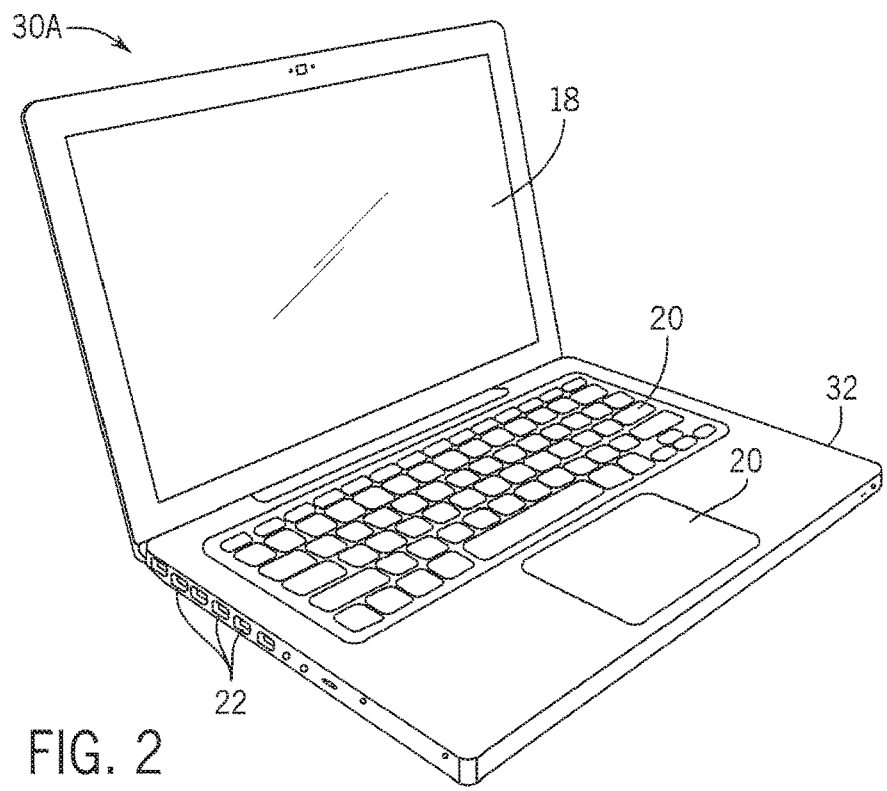
FIG. 2 is a perspective view of a notebook computer representing an embodiment of the electronic device of FIG. 1, in accordance with an embodiment.
Figure 4:
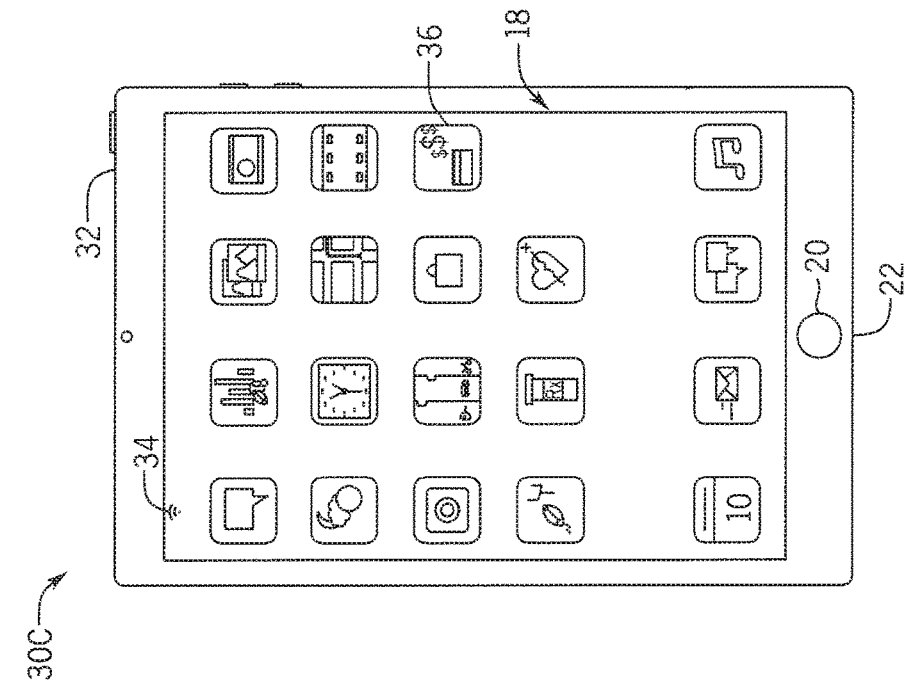
FIG. 4 is a front view of another hand-held device representing another embodiment of the electronic device of FIG. 1, in accordance with an embodiment.
Figure 3:
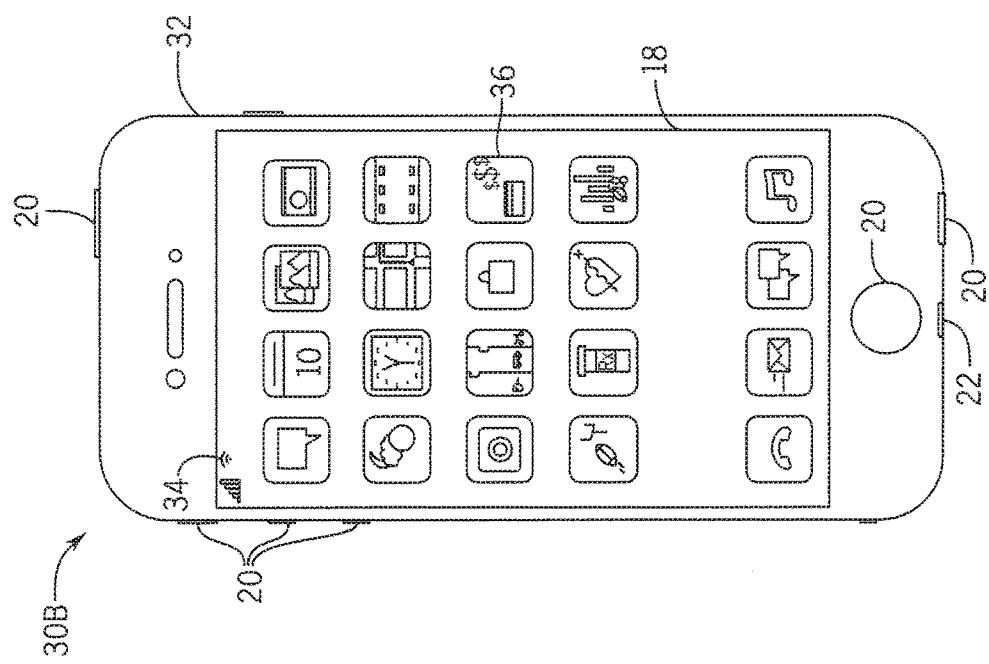
FIG. 3 is a front view of a hand-held device representing another embodiment of the electronic device of FIG. 1, in accordance with an embodiment.
Figure 5:
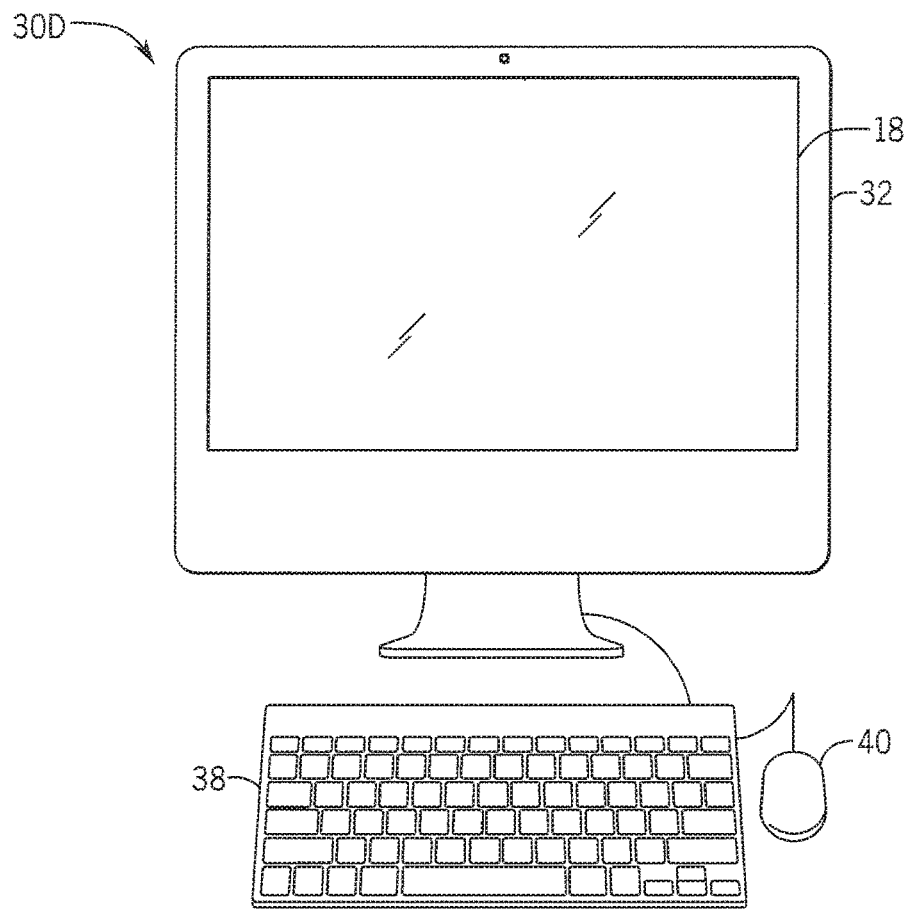
FIG. 5 is a front view of a desktop computer representing another embodiment of the electronic device of FIG. 1, in accordance with an embodiment.
Figure 6:
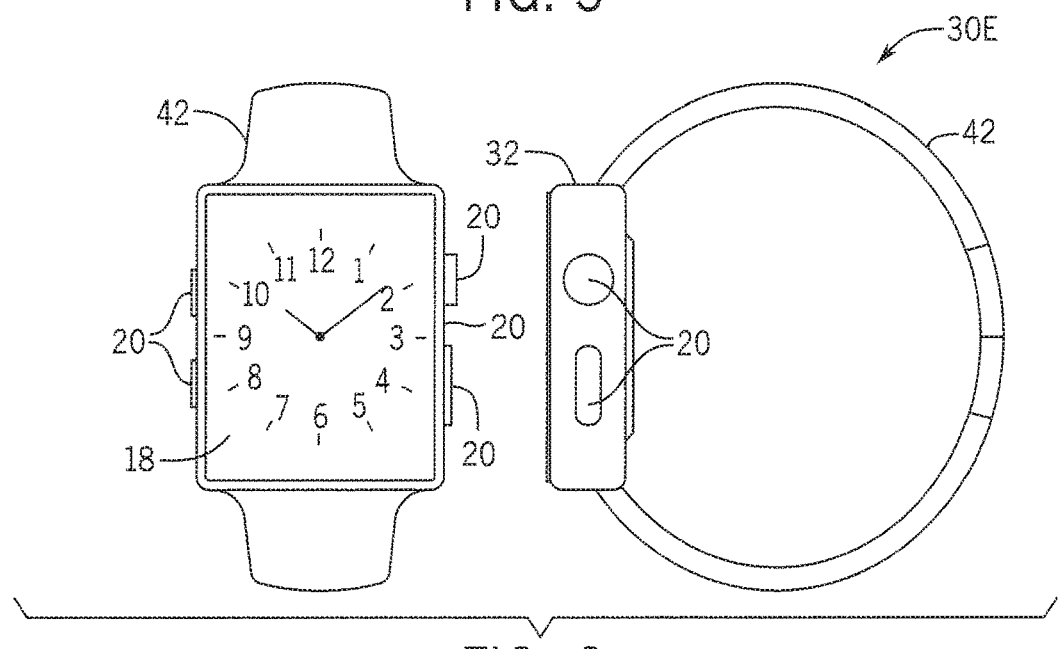
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a graphical user interface (GUI) or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 32 to protect interior components from physical damage and to shield them from electromagnetic interference. The enclosure 32 may surround the display 18, which may display indicator icons 34. The indicator icons 34 may indicate, among other things, a cellular cellular signal strength, Bluetooth connection, and/or battery life. Likewise, the handheld device 30B may include graphical icons 36 that may be part of a GUI, which which allow a user to interact with the handheld device 30B. Additionally, the illustrated I/O interface 22 may open through the enclosure 32 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 20, in combination with the display 18, may allow a user to control the handheld device 30B. For example, one of the input structures 20 may activate or deactivate the handheld device 30B, one of the input structures 20 may navigate user interface to a home screen, a user-configurable application screen, and/or activate a voice-recognition feature of the handheld device 30B, while other of the input structures 20 may provide volume control, or may toggle between vibrate and ring modes. Additional input structures 20 may also include a microphone may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 32 may be provided to protect and enclose internal components of the computer 30D such as the display 18. In certain embodiments, a user of the computer 30D may interact with the computer 30D using various peripheral input devices as the input structures 20, such as the keyboard 38 or mouse 40, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 42, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, an organic light emitting diode display, an active-matrix organic light emitting diode (e.g., AMOLED) display, and so forth), which may allow users to interact with a user interface of the wearable electronic device 30E.

Figure 7:
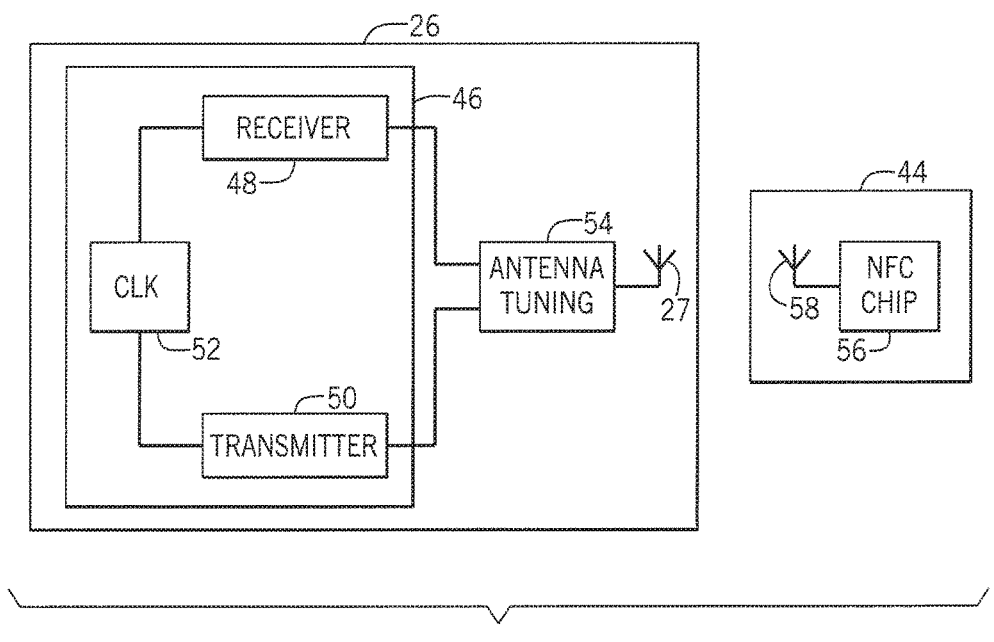
FIG. 7 is a schematic diagram of the interface of the electronic device of FIG. 1 and an NFC device, in accordance with an embodiment.

FIG. 7 illustrates the interface 26 as an NFC device internal to the electronic device 10 as well as an NFC device 44 external to the electronic device 10. As illustrated, the interface 26 includes an NFC chip 46, which may be, for example, an integrated circuit inclusive of a receiver 48, a transmitter 50, and a clock control circuit 52. Additionally, the interface 26 may include an antenna tuning circuit 54. In some embodiments, one or more components of the antenna tuning circuit 54 and/or the antenna 27 may be physically located within the NFC chip 46. Additionally illustrated in FIG. 7 is NFC device 44 as an NFC tag inclusive of an NFC chip 56 as well as an antenna 58. The NFC chip 56 may include memory, a processor, a radio frequency (RF) interface, and may be coupled to the antenna 58. As illustrated, the NFC device 44 is a passive mode device that operates using power that is derived from the interface 26 (e.g., an active NFC reader as interface 26 that receives its operating power from electronic device 10). However, in some embodiments, the NFC device 44 may instead be an active device, for example, similar to the interface 26.

In some embodiments, the NFC interface 26 may be brought into close proximity of the NFC device 44 (e.g., within approximately 5 centimeters or less of one another) to allow for short-range low-power communication between the interface interface 26 and the NFC device 44 without physical contact between the interface 26 and the NFC device 44. Magnetic field induction (e.g., inductive coupling or resonant resonant inductive coupling) allows for communication between the interface 26 and the NFC device 44 while additionally powering the NFC device 44. More specifically, the interface 26 (e.g., an active device able to send and receive information via NFC) generates an electromagnetic field with a particular frequency (e.g., at 13.56 MHz) via a signal generated by the transmitter 50, tuned via the antenna antenna tuning circuit 54, and transmitted via antenna 27. A portion of the electromagnetic field contacts the antenna 58 of the NFC device 44 and induces a magnetic field which, in turn, causes an electrical current to be generated in the antenna 27 of the interface 26 to be transmitted to the receiver 48 to allow for reception of information (e.g., data carried along the transmission emanating from the antenna 58 of the NFC device 44). The transmission and reception of electromagnetic signals at the interface 26 is described in greater detail with respect to FIG. 8.

Figure 8:
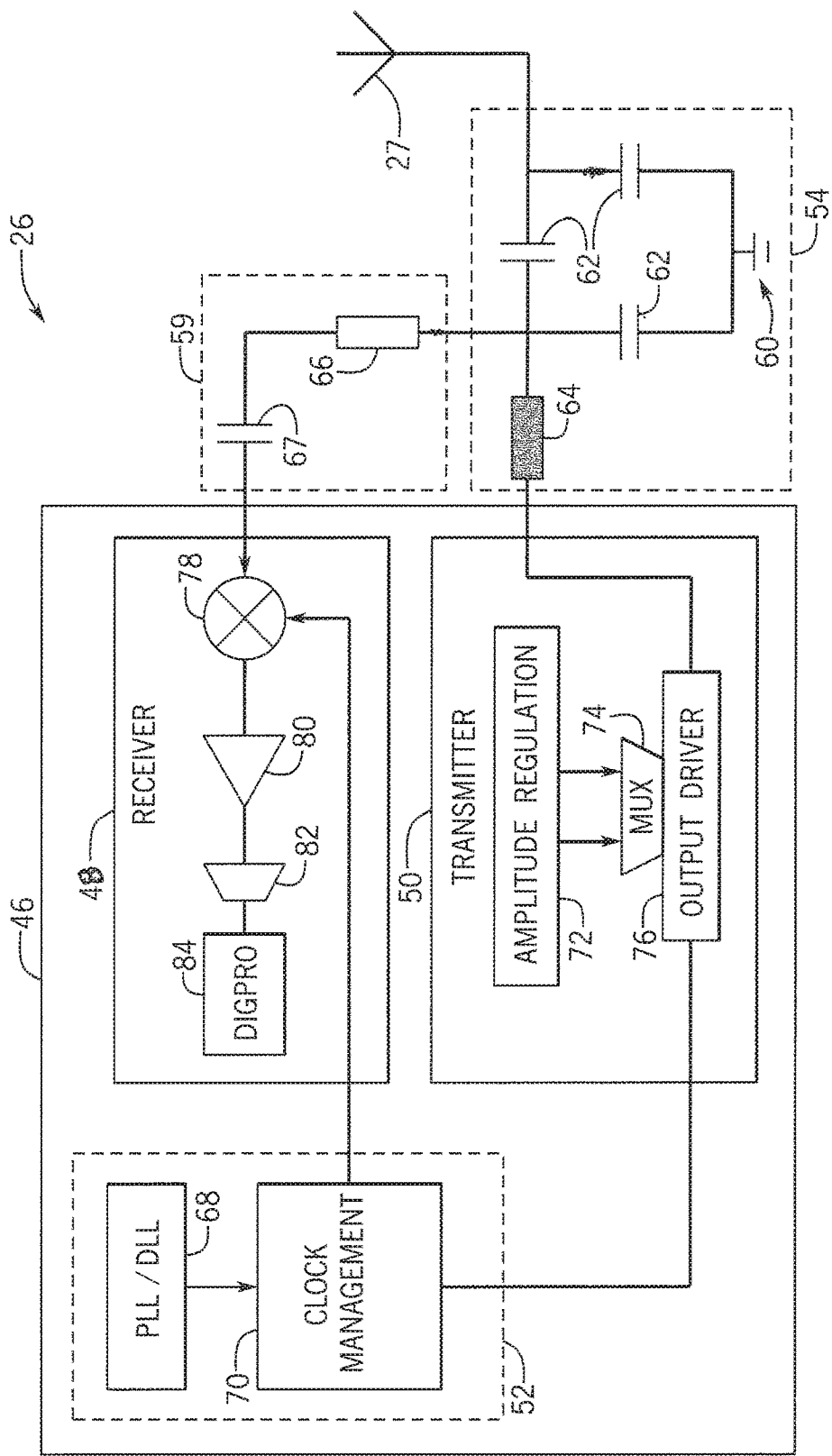
FIG. 8 is a schematic diagram of the interface of FIG. 7, according to an embodiment.

FIG. 8 illustrates an embodiment of the interface 26 in greater detail. As illustrated, the interface 26 includes the antenna 27, the NFC chip 46, the antenna tuning circuit 54, and a receiver path tuning circuit 59. The antenna tuning circuit 54 includes capacitors 62, at least some of which may be coupled to ground 60, and an inductor 64. As signals are transmitted by the transmitter 50, the signals may pass through the antenna tuning circuit 54. The capacitors 62 and inductor 64 of the antenna tuning circuit 54 allow for signals sent by the antenna 27 to have a desired frequency such as 13.56 MHz and, accordingly, may operate as a filtering circuit. The receiver path tuning circuit 59 tunes signals before the signals are received by the receiver 48. For instance, the receiver path tuning circuit 59 may receive signals that are transmitted by the transmitter 50 and tuned via the antenna tuning circuit 54 (e.g., as feedback signals), and the receiver path tuning circuit 59 may also receive signals that are received via the antenna 27. As illustrated, the receiver path tuning circuit 59 includes a resistor 66 and a capacitor 67. The resistor 66 may operate, for example, to provide a drop in voltage to prevent input saturation of the received signals. The capacitor 67 may operate, for example, to allow for alternating current (AC) coupling of received signals.

As also shown in FIG. 8, the NFC chip 46 includes the clock control circuit 52, the transmitter 50, and the receiver 48. The clock control circuit 52 includes a phase-locked loop (PLL) and/or delay-locked loop (DLL) 68 as well as clock management circuitry 70. The PLL/DLL 68 may include an oscillator circuit (e.g., crystal oscillator circuit, LR oscillator circuit, and/or CR oscillator circuit) that provides a signal with a particular phase and frequency, for example, the frequency of the signal may be equal to a desired transmission frequency (e.g., 13.56 MHz). The clock management circuitry 70 may alter the frequency, duty cycle, or other aspects of of the signals generated by the PLL/DLL 68 and provide original or modified timing signals to the receiver 48 and/or transmitter 50.

The transmitter 50 may also include several components. For instance, as illustrated in FIG. 8, the transmitter 50 includes an amplitude regulator 72, a multiplexer 74, and output driver 76. The amplitude regulator 72 may generate signals of a particular amplitude or a range of amplitudes that may be utilized in the output driver 76 to generate an output signal from the transmitter 50. The multiplexer 74 may be used to control (e.g., select) which signals of the amplitude regulator 72 are being transmitted to the output driver 76. The output driver 76 may generate clock controlled transmission signals (e.g., controlled via timing signals received from the PLL/DLL 68), that are amplitude regulated based upon the selected signals received from the multiplexer 74 as output signals transmitted from an output of the transmitter 50, which are tuned via the antenna tuning circuit 54 and transmitted via antenna 27.

The receiver 48 may include various components such as a mixer 78, a baseband analog filter 80, an analog-to-digital converter 82, and a digital signal processor 84. The mixer 78 may be, in some embodiments, an I/Q mixer that operates generally as a voltage multiplier with respect to a received input signal (e.g., a received NFC signal or, in some embodiments, a feedback signal of the antenna tuned signal generated by the transmitter 50 received at an input of the receiver 48) and a clocking signal received from the PLL/DLL 68. In this manner, the mixer 78 may operate to mix the receiver 48 input signals with respective clocking signals from the PLL/DLL 68 to generate, for example, a mixed received input signal. This mixed received input signal may be transmitted to the baseband analog filter 80 for band pass pass filtering. This filtered signal may then (optionally) be amplified and the filtered (or amplified filtered signal) can be converted from an analog format to a digital format via the analog-to-digital converter (ADC) 82. The converted digital signals may then be transmitted from the ADC 82 to a digital signal processor 84 for processing. For instance, based on the signals received, the digital signal processor 84 84 may determine whether the phase and/or frequency of the signals generated by the transmitter 50 match the phase and/or frequency of the signals generated by the clock control circuit 52.

As described above, the transmitter 50 may generate signals to be tuned by the antenna tuning circuit 54 and transmitted via the antenna 27. More specifically, components of the antenna tuning circuit 54 (e.g., capacitors 62 and inductor 64) are responsible for the tuning of the signals. For example, the frequency of a signal transmitted from the antenna 27 may be affected based on capacitance values associated with the capacitors 62 and/or an inductance value associated with the inductor 64.

As the antenna 58 of the NFC device 44 is introduced into the electromagnetic field generated by the electronic device 10 (e.g., generated by interface 26), the tuning of the antenna 27 of the interface 26 may be affected, due to, for example, magnetic and/or inductive coupling influences and loading effects on the interface 26. This change in the characteristics of the antenna 27 (e.g., antenna detuning) may cause the frequency of the antenna 27 to shift from the desired transmission frequency. This shift may worsen as the proximity of the first device and and the second device increases. Antenna detuning may cause the electronic device 10 to receive data from the NFC device 44 at a slower rate or to stop receiving data altogether. For example, antenna detuning may hinder magnetic field induction between the interface 26 and the NFC device 44, which may result in loss of power to the NFC device 44 and/or a reduction or loss in the ability of the interface 26 to communicate with the NFC device 44.

As briefly described above, the interface 26 may be used to monitor signals sent by the transmitter 50. Additionally, in some embodiments, the interface 26 may be used to detect the aforementioned detuning. For instance, signals generated by the transmitter 50 may be transmitted to the receiver 48 as feedback signals. These feedback signals may be mixed in the mixer 78, filtered in the baseband analog filter 80, converted to digital signals via the analog-to-digital converter 82, and the digital signal processor 84 may process the digital signals. Based on the digital signals, the digital signal processor 84 may determine that detuning has occurred. For example, the digital signal processor 84 may execute instructions that cause the digital signal processor 84 to determine that the digital signals are indicative of detuning. However, correction of the detuning may be implemented via trial and error correction of, for example, the signals transmitted from the transmitter 50 until the detuning is compensated for, mitigated, or otherwise eliminated. As described with relation to FIG. 9, detuning may alternatively be reduced and/or eliminated via a feedback control loop so as to accelerate the speed at which and the precision at which the detuning may be compensated for, mitigated, or otherwise eliminated.

Figure 9:
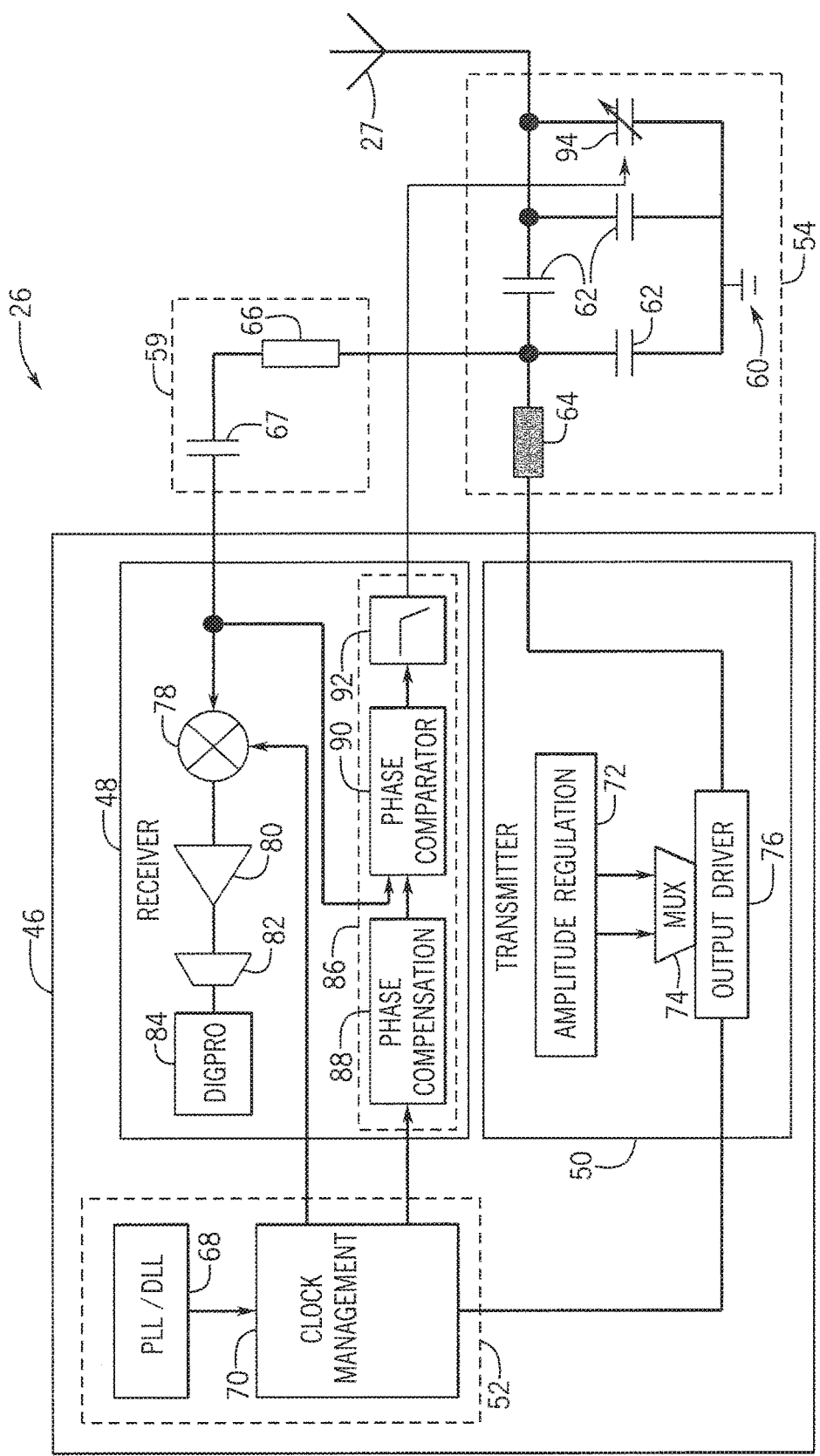
FIG. 9 is a schematic diagram of a second embodiment of the interface of FIG. 7, according to an embodiment.

Keeping the discussion of FIG. 8 in mind, FIG. 9 is a schematic diagram of an embodiment of the interface 26 that includes an additional feedback control loop 86 that can operate to automatically and dynamically track and correct front-end frequency responses indicative of antenna detuning. That is, the illustrated embodiment of the interface 26 allows for detuning to be corrected without trial and error modifications to signals transmitted by the transmitter 50. As illustrated, the feedback control loop 86 includes phase compensation circuitry 88 (or a phase compensation circuit), a phase comparator 90, and a low pass filter 92.

The phase compensation circuitry 88 may receive signals from the clock control circuit 52 and modify the signals to match alterations of the clock signals occurring in the transmitter 50 (e.g., delays or the like caused by the transmitter 50). For example, the phase compensation circuitry 88 may alter signals from the clock control circuit 52 that have changed (e.g., change in frequency or phase when passed through the transmitter 50) to match any changes in the signals. In some embodiments, the phase compensation circuitry 88 may provide a fixed phase adjustment to the signals provided to the phase comparator 90.

The phase comparator 90 may receive signals from the phase compensation circuitry 88 as well as received signals at the input of the receiver 48 (e.g., received NFC signals or, in some embodiments, a feedback signal of the antenna tuned signal generated by the transmitter 50 received at an input of the receiver 48). Based on the received signals, the phase comparator 90 may generate a signal that is representative of a difference in phase between a signal from the clock control circuit 52 and a signal received at the input of the receiver (e.g., a signal from the transmitter 50 as tuned by the antenna tuning circuit 54). In the event that the signal from the clock control circuit 52 is modified by the phase compensation circuitry 88, the phase comparator 90 may generate a signal that is representative of a difference in phase between the modified clock signal and a signal received at the input of the receiver (e.g., a signal from the transmitter 50 as tuned by the antenna tuning circuit 54).

Signals generated by the phase comparator 90 may be transmitted to the low pass filter 92, which may operate to filter the phase comparator 90 generated signals. For example, signals with a frequency equal to or less than a particular frequency value (e.g., less than 5 kHz) may pass through the low pass filter 92, while signals with frequencies above the particular frequency may be attenuated before passing through the low pass filter 92 so that changes in output of the low pass filter 92 are kept at or below a predetermined level.

Signals output from the low pass filter 92 (e.g., via an output of the receiver 48) may be received by the variable capacitance element 94. In some embodiments, the variable capacitance element 94 may be a veractor diode or a vericap diode. The variable capacitance element 94 may operate a circuit that provides a capacitance that varies based on the voltage of the signals received (e.g., a variable capacitor). Thus, changes in voltage of the signals transmitted from the output of the receiver (e.g., from the low pass filter 92) cause the capacitance of the variable capacitance element 94 of the antenna tuning circuit 54 to be altered. Changes to the capacitance of the variable capacitance element 94 allow for changes to the tuning aspects of the tuning circuit and, thus, allow for detuning to be corrected. In some embodiments, the alteration and setting of the variable capacitance element 94 may be performed prior to any data being transmitted as part of a signal generated by the transmitter 50. For example, the operation of the feedback control loop 86 and the setting of the variable capacitance element 94 may be performed in less than 5 ms and may be performed as part of an initiation procedure to help ensure that transmissions from the antenna 27 are properly tuned with respect to the antenna 44 for a given distance therebetween.

As previously discussed, a signal output from the output of the transmitter 50 may have a particular voltage that has been generated to cause the capacitance of the variable capacitance element 94 to be modified based on the voltage of the signal received from the output from the transmitter 50. A change in the capacitance of the variable capacitance element 94 causes signals sent from the transmitter 50 to be dynamically tuned by the antenna tuning circuit 54, as based upon the difference in phase between a signal generated by the clock control circuit 52 and the signal generated by the transmitter 50. In other words, the transmitter 50 may generate signals of a first frequency, and each of those signals may be automatically and dynamically tuned by the antenna tuning circuit 54 based on the particular phase difference between the signals generated by the transmitter 50 and the clock control circuit 52. The signals generated by the transmitter 50 may be tuned via the antenna tuning circuit 54 to have a phase and frequency that is the same as the phase and frequency of the signals generated by the clock control circuit 52, which may reduce or altogether eliminate antenna detuning.

As mentioned above, changes in distance between the antenna 27 and antenna 58 can cause detuning of the antenna 27. However, as the distance changes, the interface 26 can automatically and constantly correct the detuning. For instance, changes in distance between the antenna 27 of the electronic device 10 and the antenna 58 of the NFC device 44 may cause the signals generated by the transmitter 50 to change (e.g., become improperly tuned via the antenna tuning circuit 54). However, as the tuning of the signals generated by the transmitter 50 changes, corresponding signals are generated by the feedback control loop 86. The corresponding signals cause the capacitance of the variable capacitance element 94 to vary, and the varying capacitances of the variable capacitance element 94 cause the signals generated by the transmitter 50 to be tuned such that the frequency of the electromagnetic field generated by the antenna 27 may approach a desired value, such as 13.56 MHz. In other words, the transmitter 50 may generate signals that have the same frequency, and each signal will be tuned individually by adjusting the voltage of signals generated by the feedback control loop 86 that alter the capacitance of the variable capacitance element 94. Accordingly, dynamic and continual correction of detuning of the antenna 27 may be achieved without resorting to trial and error modification of the signals by the transmitter 50. Furthermore, signals generated by the transmitter 50 may be corrected in five milliseconds or less. That is, the interface 26 allows for detuning to be eliminated within five milliseconds of the transmitter 50 generating a signal.

Figure 10:
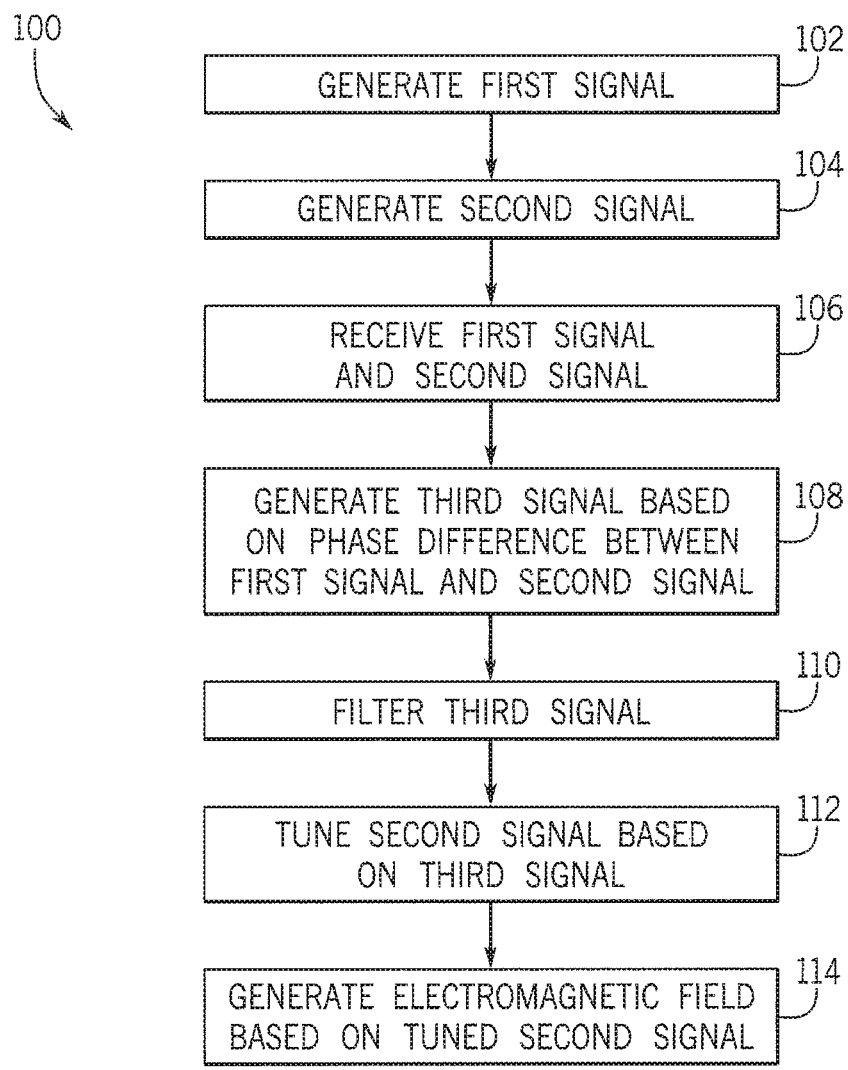
FIG. 10 is a flow chart of a method for correcting detuning of an antenna using the interface of FIG. 9, according to an embodiment.

FIG. 10 is a flow chart of a method 100 for correcting detuning of an antenna 27. The method 100 may be performed by the interface 26. Additionally, while the method 100 is described below in a particular order, it is to be appreciated by those skilled in the art that the method 100 may be performed in an order that differs from the order described below.

At block 102, a first signal is generated. The first signal may be generated by the clock control circuit 52. For example, as described above, the first signal may be associated with a desired frequency of an electromagnetic field to be generated by the antenna 27. At block 104, a second signal is generated. The second signal may be generated by the transmitter 50 or otherwise received at an input of the receiver 48. Additionally, properties of the second signal, such as phase and frequency, may be based on the distance between the antenna 27 of the electronic device 10 and the antenna 58 of the NFC device 44.

At block 106, the first and second signals may be received. For example, as explained above, the phase comparator 90 of the feedback control loop 86 may receive the signals generated by the clock control circuit 52 and the transmitter 50 as tuned by the antenna tuning circuit 54. Additionally, in some embodiments, the first signal may be modified by the phase compensation circuitry 88 prior to being received by the phase comparator 90.

At block 108, a third signal may be generated based on the phase difference between the first signal and the second signal. As described above, such a signal may be generated by the phase comparator 90.

At block 110, the third signal may be filtered. For instance, the third signal may be filtered by the low pass filter 92. In other words, if the frequency of the third signal surpasses a particular frequency, the third signal may be attenuated so that the third signal has a frequency that does not exceed the particular frequency.

At block 112, the second signal may be tuned (e.g., via the antenna tuning circuit 54) based on the third signal, which may be transmitted from an output of the transmitter 50. For instance, as described above, the third signal may be received by the variable capacitance element 94, which may cause the antenna tuning circuit 54 to tune the signal generated by the transmitter 50 (i.e., the second signal). More specifically, the third signal may cause the capacitance of the variable capacitance element 94 to change, and the change in capacitance will cause the second signal to be tuned to a desired frequency, such as 13.56 MHz.

At block 114, the antenna 27 may generate an electromagnetic field based on the tuned second signal. As discussed above in relation to FIG. 9, the electromagnetic field may have a frequency equal to a desired frequency (e.g., 13.56 MHz) because the second signal was previously tuned via the antenna tuning circuit 54.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
a transmitter configured to generate a first signal;
a clock control circuit configured to generate a second signal;
a receiver coupled to the clock control circuit, wherein the receiver comprises a phase compensation element configured to receive the second signal prior to a phase comparator and adjust a phase of the second signal to generate a phase-adjusted second signal;
tuning circuitry coupled to the transmitter and the receiver, wherein the tuning circuitry comprises a variable capacitance element and at least one fixed capacitance element having a fixed capacitance, wherein the variable capacitance element is configured to provide a dynamic capacitance based upon a voltage value related to a determined phase difference between the first signal and the phase-adjusted second signal, wherein the tuning circuitry is configured to adjust a frequency of the first signal to generate a tuned signal based upon a total capacitance comprising the fixed capacitance and the dynamic capacitance; and
an antenna coupled to the tuning circuitry and configured to generate an electromagnetic field based on the tuned signal.

2. The electronic device of claim 1, wherein the receiver is coupled to the tuning circuitry and comprises the phase comparator, wherein the phase comparator is configured to generate an indication of a difference in phase between the phase-adjusted second signal and the first signal as a phase compared signal.

3. The electronic device of claim 2, wherein the receiver comprises a filter coupled to the phase comparator and configured to filter the phase compared signal to generate the voltage value.

4. The electronic device of claim 3, wherein the receiver comprises an output coupled to the variable capacitance element and configured to transmit the voltage value to the variable capacitance element.

5. The electronic device of claim 1, wherein the tuning circuitry is configured to adjust the frequency of the first signal to generate the tuned signal corresponding to the electromagnetic field having a frequency of 13.56 MHz.

6. The electronic device of claim 1, wherein the tuning circuitry is configured to adjust the frequency of the first signal to generate the tuned signal corresponding to the electromagnetic field having a predetermined frequency.

7. The electronic device of claim 1, wherein the variable capacitance element is directly connected to ground.

8. The electronic device of claim 7, wherein the at least one fixed capacitance element comprises a plurality of fixed capacitance elements, wherein at least a portion of the plurality of the fixed capacitance elements are directly connected to ground.

9. A method comprising:
receiving an input signal having a first phase from a transmitter;
receiving a phase-shifted clock signal having a second phase from a phase compensation element configured to receive a clock signal having a third phase from a clock control circuit configured to transmit the clock signal to the transmitter;
comparing the input signal having the first phase with the phase-shifted clock signal having the second phase;
generating a phase comparison signal based upon a difference in phase between the input signal having the first phase and the phase-shifted clock signal having the second phase; and outputting a control signal having a voltage based upon the phase comparison signal to control an amount of capacitance of a variable capacitance element of an antenna tuning circuit of a communication interface.

10. The method of claim 9, wherein outputting the control signal causes tuning circuitry to adjust a frequency of the input signal to generate a tuned signal based at least in part upon the amount of capacitance of the variable capacitance element.

11. The method of claim 9, comprising filtering the phase comparison signal to generate the control signal.

12. The method of claim 9, wherein outputting the control signal causes tuning circuitry to adjust a frequency of the input signal to generate a tuned signal based upon a total amount of capacitance, wherein the total amount of capacitance comprises the amount of capacitance of the variable capacitance element and an amount of capacitance of a fixed capacitance element.

13. The device of claim 9, wherein the variable capacitance element is directly coupled to ground.

14. A device, comprising:
a transmitter configured to generate a first signal having a first phase;
a clock control circuit configured to generate a second signal having a second phase; and
a receiver comprising:
an input configured to receive the first signal having the first phase;
a phase compensation circuit configured to receive the second signal and adjust a phase of the second signal based upon an operational characteristic of the transmitter to generate a phase-adjusted second signal;
a phase comparator configured to:
compare the first signal having the first phase with the phase-adjusted second signal; and
generate a phase comparison signal based upon a difference in phase between the first signal having the first phase and the phase-adjusted second signal; and
an output configured to transmit a control signal having a voltage based upon the phase comparison signal to control an amount of capacitance of a variable capacitance element of an antenna tuning circuit of a communication interface.

15. The device of claim 14, wherein:
the clock control circuit is coupled to the transmitter and the receiver; and
the clock control circuit is configured to transmit the second signal having the second phase to the phase comparator.

16. The device of claim 14, comprising a Near-Field Communication (NFC) chip comprising the clock control circuit, the transmitter, and the receiver.

17. The device of claim 14, comprising the antenna tuning circuit, wherein the antenna tuning circuit is coupled to the transmitter and the receiver and comprises tuning circuitry coupled to the transmitter, wherein the tuning circuitry comprises the variable capacitance element and at least one fixed capacitance element having a fixed capacitance.

18. The device of claim 17, wherein the variable capacitance element is configured to provide an adjusted capacitance based upon the control signal to adjust a frequency of the first signal to generate a tuned signal based upon a total capacitance comprising the fixed capacitance and the adjusted capacitance.

19. The device of claim 18, comprising an antenna coupled to the antenna tuning circuit and configured to generate an electromagnetic field having a predetermined frequency based upon the tuned signal.

20. The device of claim 17, wherein the variable capacitance element is directly coupled to ground.

* * * * *